(No Model.) 2 Sheets—Sheet 1.
T. L. AVELING.
WHEEL SCRAPER.
No. 484,841. Patented Oct. 25, 1892.
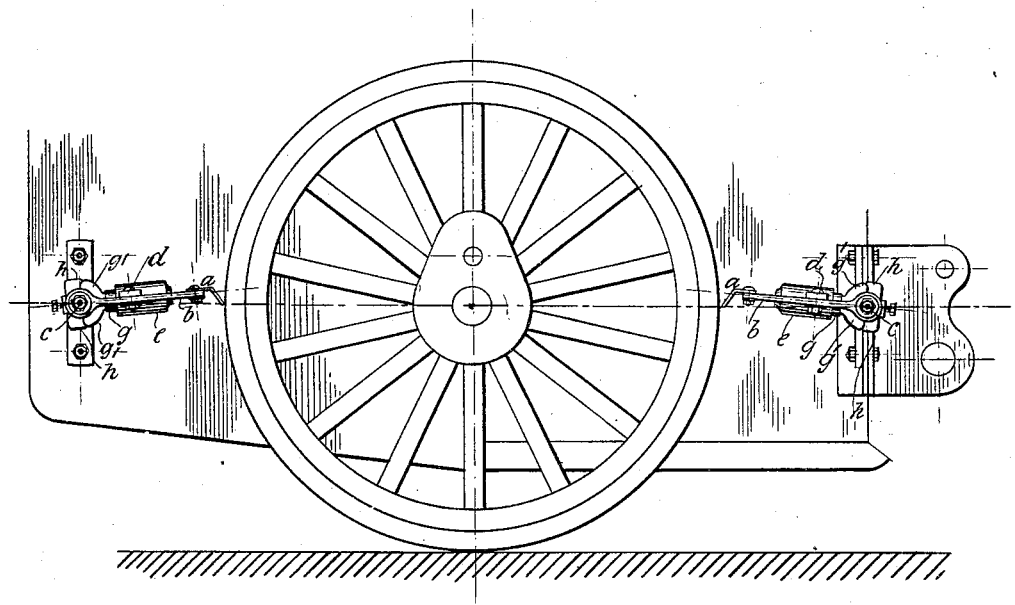
Fig. 1.
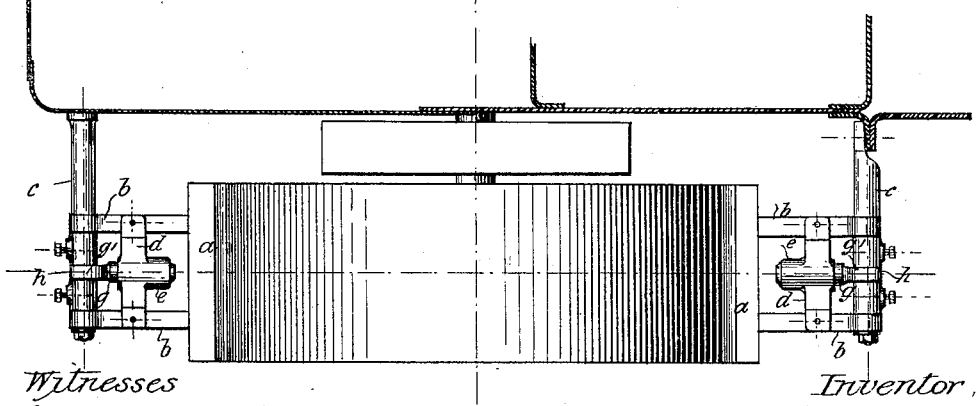
Fig. 1.ˣ
Witnesses
B. W. Miller
C. M. Brooke
Inventor,
Thomas L. Aveling,
by his attorneys,
Baldwin Davidson & Wight (No Model.) 2 Sheets—Sheet 2.

T. L. AVELING.
WHEEL SCRAPER.

No. 484,841. Patented Oct. 25, 1892.

Witnesses,
B. W. Miller
C. W. Brooke

Inventor,
Thomas L. Aveling,
by his attorneys
Baldwin Davidson & Wight

UNITED STATES PATENT OFFICE.

THOMAS LAKE AVELING, OF ROCHESTER, ENGLAND.

WHEEL-SCRAPER.

SPECIFICATION forming part of Letters Patent No. 484,841, dated October 25, 1892.

Application filed May 14, 1892. Serial No. 433,012. (No model.)

*To all whom it may concern:*

Be it known that I, THOMAS LAKE AVELING, engineer, a subject of the Queen of Great Britain, residing at Rochester, in the county of Kent, England, have invented certain new and useful Scrapers for Wheels, of which the following is a specification.

Figure 3:
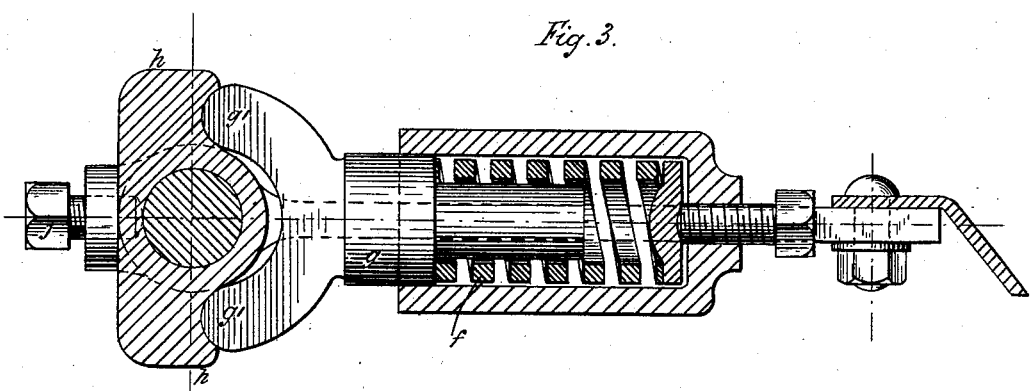
Figure 2:
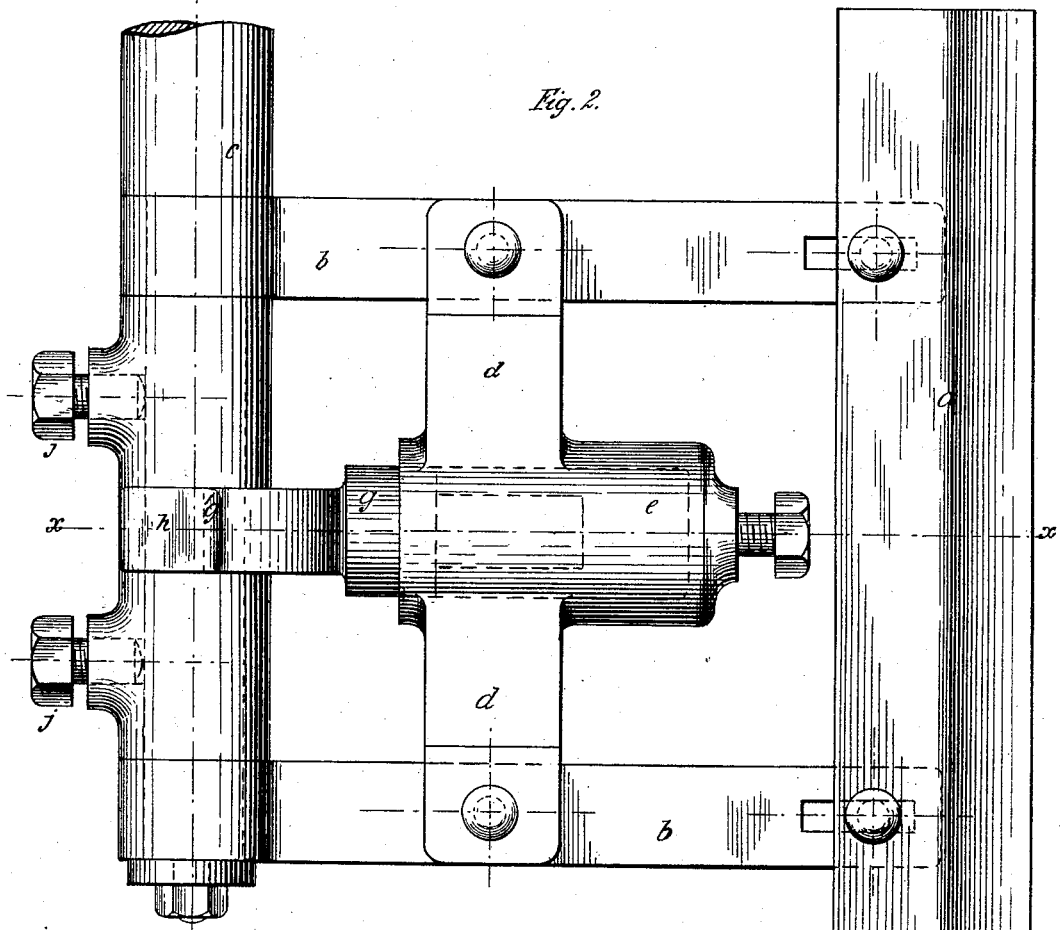

Figures 1 and $1^\times$ are respectively a side elevation and plan of a wheel or roller having a pair of scrapers fitted to it. Fig. 2 is a plan of the scraper; and Fig. 3 is a section on the line $x$ $x$, Fig. 2.

The scraper-blade $a$ is carried by rods $b$, pivoted to a fixed axis $c$, parallel to the surface of the roller. This axis is fixed in any convenient manner to the frame. The attachment of the scraping-blade $a$ to the rods $b$ is adjustable to provide for the wear of the blade. Fixed to the rods $b$ is a cross-bar $d$, supporting a cylinder $e$, containing a spring $f$ and a piston $g$, pressing upon the spring. The piston carries two projections $g'$ $g'$, one on each side, which bear against abutments $h$, fixed upon the axis $c$. These abutments can be turned upon the axis and secured by screws $j$ in any position, and are so adjusted as to cause the piston $g$ to slightly compress the spring $f$, making it in its turn press the scraping-blade $a$ against the roller. With this arrangement if a stone or other impediment gets between the scraping-blade and the roller the former can give way by turning about the axis, compressing the spring, which brings it back again when the stone has passed through.

What I claim is—

1. The combination of an axis, a projection upon the axis, a scraping-blade free to turn about the axis, a rod turning with the scraping-blade but free to move radially to the axis, a projection upon the rod bearing upon the projection on the axis, and a spring carried by the scraping-blade and bearing on the radial rod.

2. The combination of an axis, a pair of projections upon the axis, a scraping-blade free to turn about the axis, a rod turning with the scraping-blade but free to move radially to the axis, a pair of projections upon the rod bearing upon the projections upon the axis, and a spring carried by the scraping-blade and bearing on the radial rod.

3. The combination of an axis, a pair of projections upon the axis, a scraping-blade free to turn about the axis, a cylinder carried by the scraping-blade, a spring in the cylinder, a piston also in the cylinder and bearing upon the spring, and a pair of projections carried by the piston and bearing upon the projections on the axis.

THOMAS LAKE AVELING.

Witnesses:
EDWIN TODD,
*Accountant, Weston Road, Strood.*
STEPHEN T. AVELING,
*Engineer, the Restoration House, Rochester.*